March 27, 1934.  T. L. SHERMAN  1,952,098
CRANKLESS MECHANISM
Filed Oct. 19, 1932  2 Sheets-Sheet 1
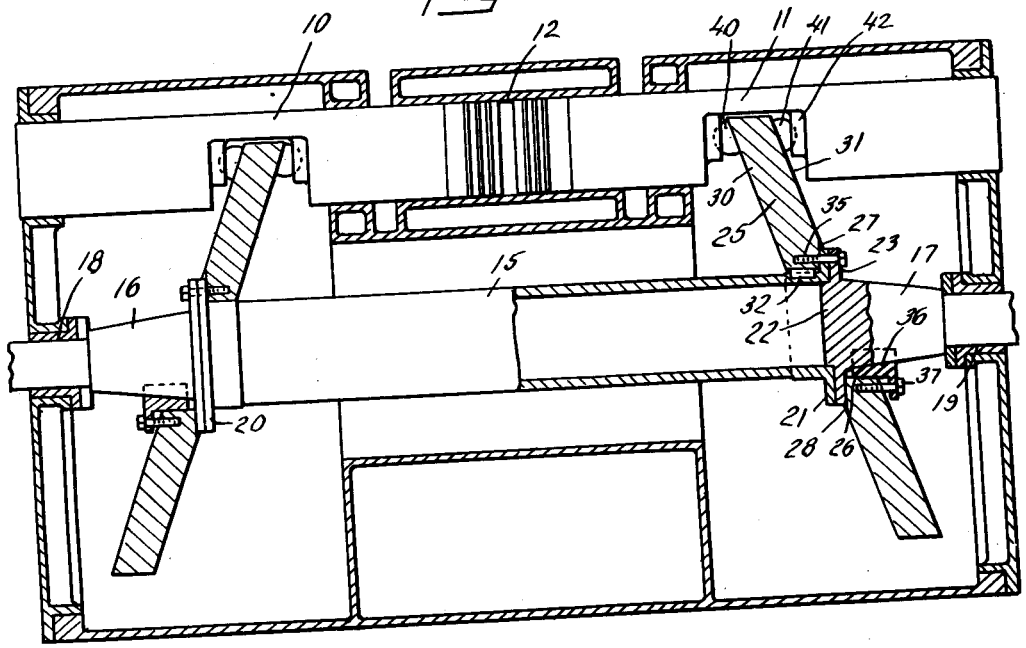
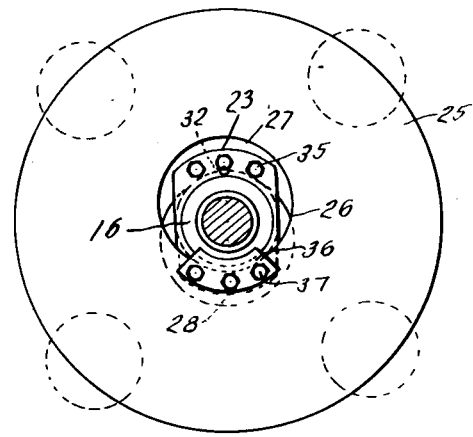
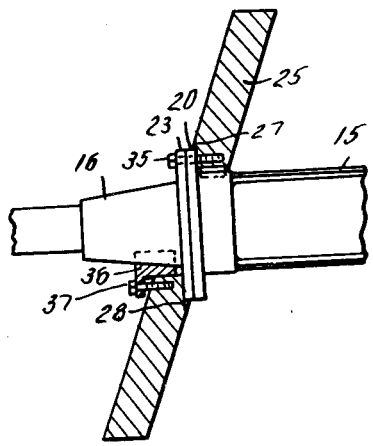
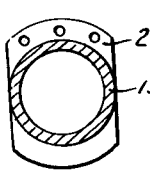
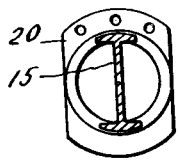
INVENTOR
Thomas L. Sherman
BY
Marshall & Hawley
ATTORNEYS.

March 27, 1934.   T. L. SHERMAN   1,952,098
CRANKLESS MECHANISM
Filed Oct. 19, 1932   2 Sheets-Sheet 2

INVENTOR
Thomas L. Sherman
BY
Marshall & Hawley.
ATTORNEYS

Patented Mar. 27, 1934

1,952,098

UNITED STATES PATENT OFFICE 1,952,098

CRANKLESS MECHANISM

Thomas L. Sherman, Norwood, Mass., assignor to Michell-Crankless Engines Corporation, New York, N. Y., a corporation of New York Application October 19, 1932, Serial No. 638,550

18 Claims. (Cl. 74—14)

This invention relates to crankless mechanisms and particularly to swash plate or slant mountings for such mechanisms.

Crankless mechanisms of the type in connection with which this invention has been developed comprise a shaft having a slant connected thereto and pistons coacting with the slant and adapted to impart rotation thereto, thereby causing the slant shaft to rotate. In crankless engines the charges in the cylinders are fired when the pistons are disposed substantially at the outer ends of the cylinders or just after the pistons have passed their outer dead center positions. When this condition exists the portions of the slant engaging the pistons so located are disposed at their most acute angles with reference to the shaft axis. The greatest load imposed on the slant is thus imposed on the portions of the slant making the most acute angles with the axis.

It has been proposed in the past to bolt a slant ring to a flange on a hub carried by the shaft, but such structures have been open to the objection that too great a tension stress has been placed on the bolts. For instance, if the shaft is provided with a flange and a slant ring is bolted to the flange at one side thereof, the thrust on the slant in one direction must be taken by the bolts.

Furthermore, in crankless mechanisms in which a pair of slants is mounted on a shaft and coact with a pair of opposed pistons in a cylinder, the portion of the shaft between the slants must be stiff but light in weight, in order to limit deflections and to prevent "whirling" speeds.

This invention has for its salient object to provide a slant and shaft so relatively constructed and arranged that the greatest thrust loads imparted to the slant will not be taken by the bolts or other connecting means between the shaft and slant.

Another object of the invention is to provide a slant shaft construction and a slant mounting thereon so constructed and arranged that the parts can be readily assembled and disassembled in the engine, pump or other crankless mechanism.

Another object of the invention is to provide a shaft for opposed slants and bearings therefor, so constructed and arranged that the shaft will be relatively light but stiff in order to limit deflections thereof and to provide against whirling speeds.

Another object of the invention is to provide a slant and a mounting therefor so constructed and arranged that the parts can be economically manufactured.

Further objects of the invention will appear from the following specification taken in connection with the drawings which form a part of this application, and in which—

Fig. 1 is a longitudinal sectional elevation of a crankless mechanism having a shaft and slant constructed in accordance with the invention;

Fig. 2 is a transverse sectional elevation showing the slant mounted on the shaft;

Fig. 3 is a sectional elevation taken at right angles to Fig. 2;

Figs. 4 and 5 are sectional elevations illustrating two cross sections of suitable shaft structures;

Figure 6:
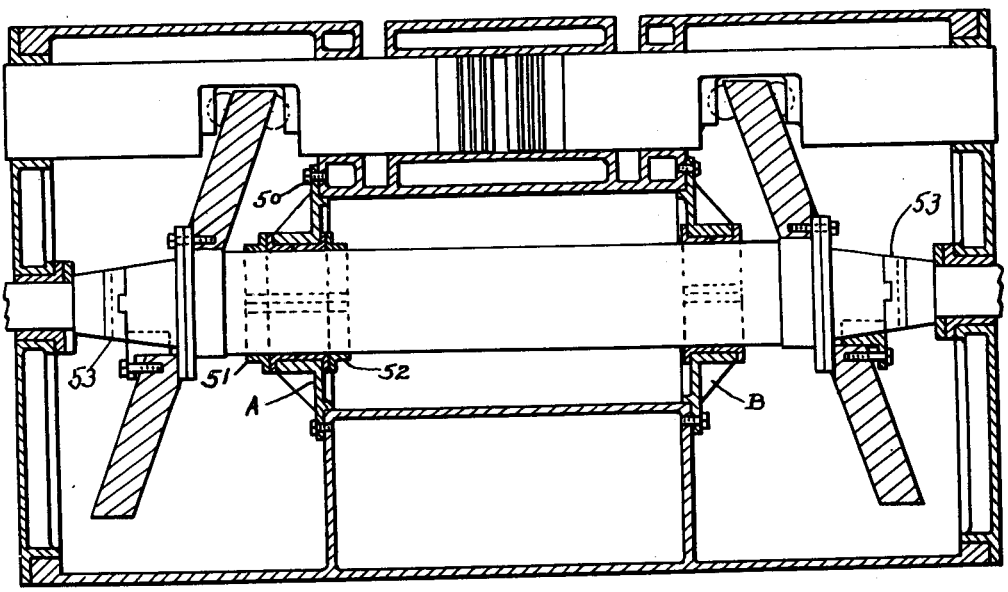
Fig. 6 is a view similar to Fig. 1 but showing a slight modification of the invention.
Figure 7:
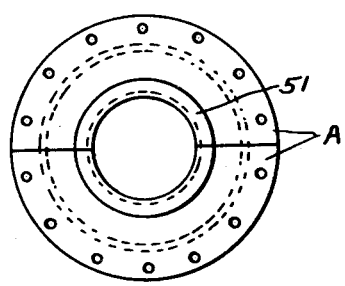
Fig. 7 is an end elevation of the shaft bearing shown in Fig. 6.

The invention briefly described consists of a combination of a shaft and a pair of opposed slants, the shaft comprising a plurality of sections having flanges arranged to engage and be secured to each other. The slants are provided with cylindrical openings therethrough arranged to receive the shaft and with parallel plane surfaces which are normal to the axis of the shaft when the slants are mounted thereon and engage the outer surfaces of the flanges on opposite sides of the shaft, one flange at each end of the shaft being engaged at one side of the shaft axis and the other flange being engaged at the other side thereof. The means for securing the flanges and shaft sections together also serves to secure the flanges to the slants.

Further details of the invention will appear from the following description.

In the particular embodiment of the invention illustrated there is shown a crankless mechanism which may function as an engine or pump and comprises a plurality of oppositely disposed pistons 10 and 11 which reciprocate in a cylinder 12. A plurality of such sets of pistons and cylinders may be located around the centrally disposed shaft, the axes of the cylinders being parallel to the axis of the shaft.

The shaft comprises a central section 15 and end sections 16 and 17, the latter being mounted in bearings 18 and 19. The central shaft section 15 should be light in weight, but rigid in construction, and may be cylindrical or tubular, as shown in Figs. 1 and 4, or may have an I beam section, as shown in Figs. 3 and 5.

The central section 15 has laterally extending flanges 20 and 21 at the ends thereof. Each of the end sections has cylindrical projecting portion 22 at one end adapted to fit within the outer end of the section 15 and has a laterally extending flange 23 adapted to fit against the end flange of the shaft, as shown at the right in Fig. 1.

The slant 25 is constructed in the form of a ring having a central cylindrical opening 26 therein arranged to encircle the shaft and also having parallel plane surfaces 27 and 28 which are normal to the axis of the shaft when the shaft is mounted thereon. The surfaces 27 and 28 are offset relative to each other. Further details of construction of the slant ring are described in copending application 531,404, filed April 20, 1931.

The outer surfaces 30 and 31 of the slant ring 25 are disposed in parallel planes and can be readily machined before the slant is assembled on the shaft.

Each of the slants is mounted on a shaft in the manner illustrated in Fig. 1, wherein it will be seen that the slant ring is keyed at 32 to the section 15 and the surface 27 of the slant engages the upper portion of the flange 21 and the surface 28 engages the lower portion of the flange 23. Bolts 35 extend through the flanges 21 and 23 and into the slant.

The slant is furthermore positioned and mounted on the shaft by means of a wedge 36 which engages the outer surface of the shaft section 17 and is positioned between this surface and the cylindrical shaft opening in the slant. Bolts 37 extend through the wedge and secure the wedge to the slant.

The slants coact with the pistons in the usual well known manner by means of slippers 40 and 41 which engage the surfaces 30 and 31 of the slant and are mounted in a bridge or extension 42 formed on the piston.

Attention is called to the fact that the flanges 21 and 23 abut at approximately the center line of the slant and furthermore that the major forces or loads transmitted by the slants tend to maintain the flanges in compression, thus relieving the screws or bolts from sustaining any material load.

In Fig. 6 the shaft bearings A and B are disposed inside the slants for the purpose of eliminating strain from the engine casing. The bearings are split and are bolted to the engine as shown at 50 between collars 51 and 52 carried by the shaft. The outer bearings C, D, may be omitted or the outer shaft sections may be provided with universal joints 53, as shown.

From the foregoing description it will be clear that a simple, practical and efficient slant mounting has been designed and that the structure described will efficiently sustain the loads transmitted and render the construction easily accessible for assembling and disassembling the parts. Attention is directed to the fact that the shaft is supported in only two bearings, namely, at the ends thereof, and this feature also facilitates the assembling of the parts.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a shaft comprising a plurality of sections, a slant ring surrounding and secured to the shaft, means engaging the slant ring and one shaft section for holding the slant against rotation relative to the shaft, and means connected to the other section for securing the sections to each other and to the slant.

2. In combination, a shaft comprising a pair of sections, one section having a portion seated and centered in the other section, a flange at one end of each section, a slant ring surrounding the shaft sections and engaging said flanges, and means securing the flanges to each other and the slant to the flanges.

3. In combination, a shaft comprising a pair of sections, one section having a portion seated and centered in the other section, a flange at one end of each section, disposed at right angles to the shaft axis, a slant ring surrounding the shaft sections and having parallel flat surfaces engaging said flanges, and means securing the flanges to each other and the slant to the flanges.

4. In combination, a shaft comprising a pair of sections, each section having a flange arranged to abut and fit against the flange of the other section, a slant ring mounted on one section and secured against rotation thereon, said ring having plane parallel surfaces engaging the surface of one flange at one side of the shaft axis and the surface of the other flange at the other side of the shaft axis, and means for securing the ring to said flanges.

5. In combination, a crankless mechanism comprising a cylinder, a piston therein, a shaft comprising a pair of flanged sections, a slant mounted on said shaft and operatively connected to said piston, and means connecting said slant to the flanges and the flanges together, the slant being so arranged relative to the flanges that the action of the piston on the slant during the early portion of the power stroke will tend to press the flanges together.

6. In combination, a shaft comprising a pair of sections, one section having a portion seated and centered in the other section, a flange at one end of each section, a slant ring surrounding the shaft sections and engaging said flanges, and means securing the flanges to each other and the slant to the flanges, the center line of the slant intersecting the plane of engagement of the flanges on the shaft axis.

7. In combination, crankless mechanism comprising a cylinder, oppositely acting pistons therein, a shaft comprising three sections including a central section having flanges at the ends thereof and end sections having flanges secured to the end flanges of the central section, supporting bearings for the end sections, and a slant ring for each piston and engaging one end section and the central section.

8. In combination, crankless mechanism comprising a cylinder, oppositely acting pistons therein, a shaft comprising three sections including a central section having flanges at the ends thereof and end sections having flanges secured to the end flanges of the central section, supporting bearings for the end sections, and a slant ring for each piston and engaging one end section and the central section, each slant ring extending on and being secured to opposite sides of a flange on the central shaft section and a flange on the end section.

9. In combination, crankless mechanism comprising a cylinder, oppositely acting pistons therein, a shaft comprising three sections including a central section having flanges at the ends thereof and end sections having flanges secured to the end flanges of the central section, supporting bearings for the end sections, and a slant ring for each piston and engaging one end section and the central section, each slant ring extending on and being secured to opposite sides of a flange on the central shaft section and a flange on the end section, the center line of the slant intersecting the plane of engagement of the flanges on the shaft axis.

10. In combination, crankless mechanism comprising a cylinder, oppositely acting pistons therein, a shaft comprising three sections including a central section having flanges at the ends thereof and end sections having flanges secured to the end flanges of the central section, supporting bearings for the end sections, and a slant ring for each piston and engaging one end section and the central section, each slant ring extending on and being secured to opposite sides of a flange on the central shaft section and a flange on the end section, each slant being so arranged relative to the flanges that the action of the piston on the slant during the early portion of the power stroke will tend to press the flanges together.

11. In combination, crankless mechanism comprising a cylinder, oppositely acting pistons therein, a shaft comprising three sections including a central tubular section having flanges at the ends thereof and end sections having flanges secured to the end flanges of the central section, supporting bearings for the end sections, and a slant ring for each piston and engaging one end section and the central section.

12. In combination, crankless mechanism comprising a cylinder, oppositely acting pistons therein, a shaft comprising three sections including a central tubular section having flanges at the ends thereof and end sections having flanges secured to the end flanges of the central section and end portions seated in the ends of the central section, supporting bearings for the end sections, and a slant ring for each piston and engaging one end section and the central section.

13. In combination, a shaft comprising a pair of sections, one section having a portion seated and centered in the other section, a flange at one end of each section, a slant ring surrounding the shaft sections and engaging said flanges, and means securing the flanges to each other and the slant to the flanges, said securing means including a wedge member for forcing the slant against one of the flanges.

14. In combination, a shaft comprising three sections including a central section having a flange at each end thereof and end sections connected to said central section and to said flanges, a slant secured to each end of the central section, said slants being oppositely inclined relative to the shaft, and a bearing adjacent each end of the central shaft.

15. In combination, a shaft comprising three sections including a central section having a flange at each end thereof and end sections connected to said central section and to said flanges, a slant secured at each end of the central section, said slants being oppositely inclined relative to the shaft, and a bearing adjacent each end of the central shaft, said bearings being located substantially within a plane described by the innermost edge portions of the slants.

16. A shaft comprising three sections, a central section and an end section secured to each end thereof, opposed slants secured to the ends of the central section, and shaft bearings disposed only adjacent the ends thereof.

17. A shaft comprising three sections, a central section and an end section secured to each end thereof, opposed slants secured to the ends of the central section, and shaft bearings disposed only adjacent the ends of the central section thereof.

18. A shaft comprising three sections, a tubular central section and an end section secured to each end thereof, opposed slants secured to the ends of the central section, and shaft bearings disposed only adjacent the ends thereof.

THOMAS L. SHERMAN.